120,146

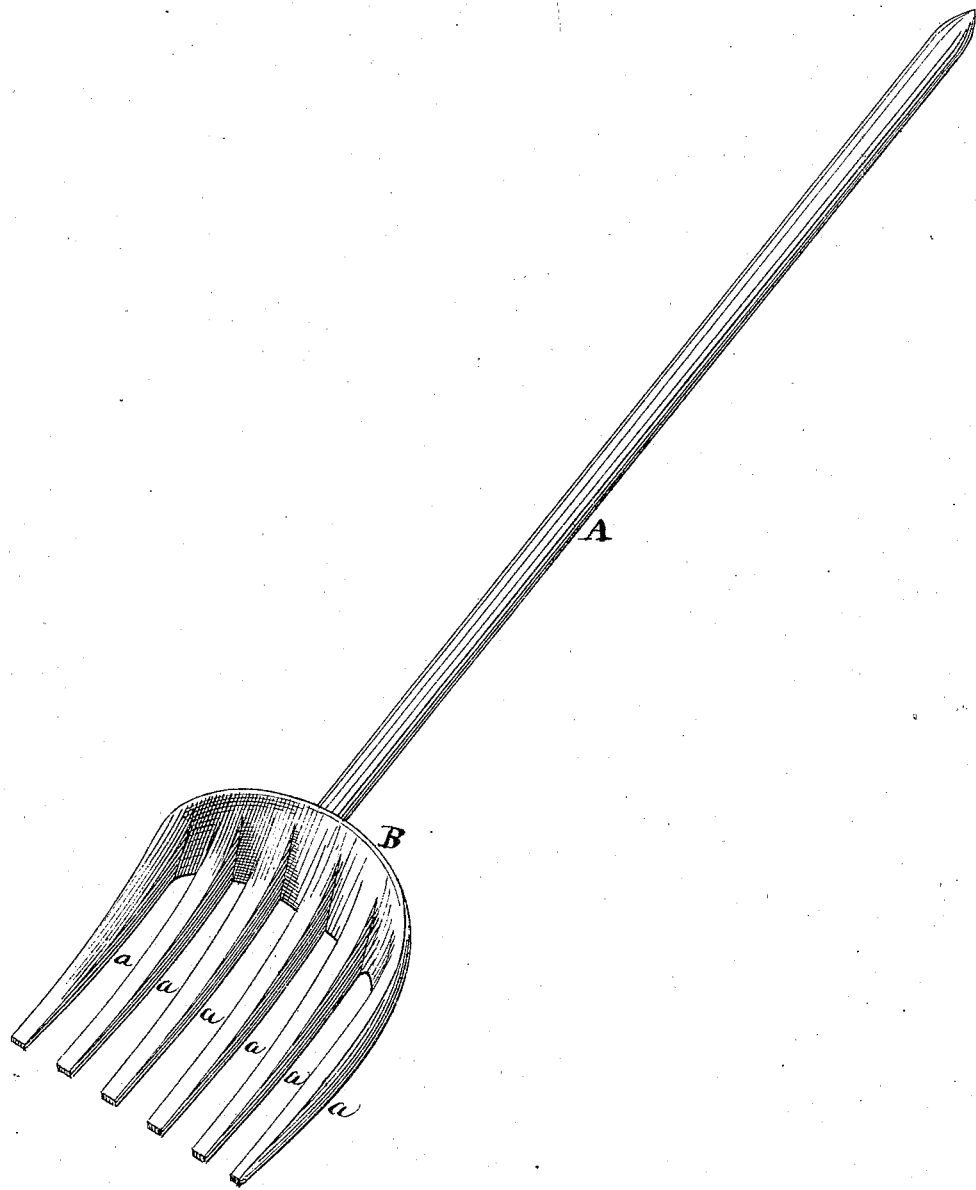

UNITED STATES PATENT OFFICE.

NOBLE S. BARNUM, OF RIDGEFIELD, CONNECTICUT.

IMPROVEMENT IN FORK-TINE SCOOPS FOR GATHERING STONES.

Specification forming part of Letters Patent No. 120,146, dated October 24, 1871.

*To all whom it may concern:*

Be it known that I, NOBLE S. BARNUM, of Ridgefield, in the county of Fairfield and State of Connecticut, have invented a new and Improved Stone-Fork; and I do hereby declare that the following is a full, clear, and exact description thereof, reference being had to the accompanying drawing making a part of this specification and to the letters of reference marked thereon.

The object of my invention is to construct a scoop-fork for the purpose of gathering or shoveling small stone into heaps or into a wheel-barrow or cart or wagon. My invention has been found very convenient and useful, and its want has long been felt. This invention consists in making the rear or back portion of the scoop in the usual form of a common grain-scoop, while the front portion is provided with tines or prongs of a peculiar form, the rear ends of which are rigidly secured to the rear portion or section of the scoop.

To enable others skilled in the art to make and use my invention, I will proceed more particularly to describe the same.

The figures represent a perspective view of my invention.

A in Figure 1 represents the handle of my improved shovel, which said handle may be of suitable form and material, and is secured to the scoop in any suitable manner. B represents the main body of the scoop, which may be made of any of the well-known metals suitable for the purpose. The rear portion of the scoop, or that portion nearest the handle, is made similar in form to an ordinary grain-scoop shovel, while the other portion, upon which the stone or other material is received, is provided with prongs or tines $a\ a\ a\ a\ a$. These prongs at their rear ends are rigidly secured to the rear portion of the scoop and are located at a suitable distance apart. On their upper surfaces, which are flat, they are of equal or parallel width throughout their entire length, while their sides and under surfaces are beveled and rounded, as shown in Fig. 2, and are made tapering from stem to point, so as to secure lightness without impairing their strength. They may be made of steel or other metal adapted to the purpose for which my improved shovel is intended to be used.

It will be seen that my invention possesses decided advantages over any other shovel hitherto used for shoveling small stone, coal, and similar materials, as the load is more readily and easily received thereupon, and any soil or dirt that may be mixed with the stone will fall through between the prongs while the load is being lifted. At the same time it is much stronger and more durable, without being perceptibly heavier than the shovels ordinarily used for such purpose.

Having thus described my invention, what I claim as new, and desire to secure by Letters Patent of the United States, is—

A shovel, the rear portion thereof being a scoop, and the front or working portion tines or prongs, substantially as herein shown and described, and for the purposes set forth.

NOBLE S. BARNUM.

Witnesses:
L. H. BAILEY,
S. D. KEELER.

(141)